United States Patent

Imai

(10) Patent No.: US 6,691,941 B2
(45) Date of Patent: Feb. 17, 2004

(54) RECORDING TAPE CARTRIDGE

(75) Inventor: Fumihito Imai, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/318,014

(22) Filed: Dec. 13, 2002

(65) Prior Publication Data

US 2003/0122014 A1 Jul. 3, 2003

(30) Foreign Application Priority Data

Dec. 28, 2001 (JP) ......................................... 2001-399523

(51) Int. Cl.[7] .............................................. G11B 15/66
(52) U.S. Cl. ..................................... 242/332.4; 360/132
(58) Field of Search ............................. 242/332.4, 348, 242/348.2, 348.3; 360/132

(56) References Cited

U.S. PATENT DOCUMENTS

| | | | | |
|---|---|---|---|---|
| 3,154,261 A | * | 10/1964 | Breuning ................. | 242/348.2 |
| 3,169,721 A | * | 2/1965 | Laa et al. ................ | 242/348.2 |
| 5,465,187 A | * | 11/1995 | Hoge et al. ................. | 360/132 |
| 6,236,539 B1 | | 5/2001 | Morita | |
| 6,445,539 B1 | * | 9/2002 | Morita et al. ................ | 360/132 |
| 6,490,133 B1 | * | 12/2002 | Okamura et al. ........... | 360/132 |
| 6,505,789 B2 | * | 1/2003 | Ridl et al. .................. | 360/132 |
| 6,515,827 B1 | * | 2/2003 | Raymond et al. ........... | 360/132 |

* cited by examiner

Primary Examiner—William A. Rivera
(74) Attorney, Agent, or Firm—Sughrue Mion, PLLC

(57) ABSTRACT

A recording tape cartridge having a recording tape; a leader member attached at the top of the recording tape; a single reel on which the recording tape is wound; a housing holding the reel rotatably and having an opening from which the tape is wound out and a holding portion adjacent to the opening; and an urging member urging and securing the leading member at the holding portion when the recording tape is taken back in the housing; the urging member having a pressing portion formed continuously in the axial direction of the leading member and contacting both ends of the leading member when the leading member is held at the holding portion. Equal force is applied to the both ends of the leading member. Therefore, the leading member does not slant and a chucking member of the tape drive securely chucks the leader member.

20 Claims, 10 Drawing Sheets

RECORDING TAPE CARTRIDGE

BACKGROUND OF THE INVENTION

1. Field of the Invention

The present invention relates to a recording tape cartridge rotatably accommodating a single reel around which a recording tape such as a magnetic tape is wound.

2. Description of the Prior Art

A recording tape such as a magnetic tape is widely employed as an external recording medium for a computer. By winding the magnetic tape on a reel and housing the reel in a housing to form a magnetic tape cartridge, only a small space is needed for storage to be able to construct a magnetic tape cartridge, which is able to record a large amount of information.

As seen in FIG. 11, when this magnetic tape cartridge is loaded in a tape drive, a leader pin attached at an end of the magnetic tape is taken up from a take-up opening by a chucking member disposed at the tape drive. The leader pin, which is taken up from a take-up opening of the housing, is lead to a reel of the tape drive through a specific magnetic tape path and is engaged with the reel. Thus, the magnetic tape 10 is wrapped around the reel and computer data are recorded on and played back from the magnetic tape.

Flanges 12A formed at both of the ends of the leading pin 12 protrude from both of the edges, in the width direction of the magnetic tape 10. When the magnetic tape 10 is taken back in the housing 70, the flange 12A held in a housing 70 by being inserted into a holder groove 40, which extends to the take-up opening, and pressed by a plate spring 50. The plate spring 50 comprises a base portion 52, which is fixed to the housing 70, and a pair of arm portions 54, which project from the base portion 52 in parallel. At each end of the arm portions 54, a pressing portion 54A is formed and engages with flanges 12A.

However, making a spring force of the arm portions 54A the same is difficult, and variation occurs. Therefore, as shown by two-dot chain line in FIG. 11, There is a possibility that the leader pin 12 will be slanted by the difference of the spring forces and will not be correctly engaged with the chucking device.

SUMMARY OF THE INVENTION

An object of this invention is to solve the above-mentioned problems. Accordingly, an object of this invention is to provide a recording tape cartridge, in which, when the recording tape is taken up by a reel, a leader member, such as a leader pin attached on an end portion of a recording tape, is held at an optimal position inside a housing, and, when the recording tape is wound out from the housing, the leader member is correctly chucked by a chucking member of a tape drive.

A first aspect of this invention for achieving the above-mentioned object is a recording tape cartridge comprising a recording tape; a leader member attached at an end of the recording tape and extending in a width direction of the recording tape; a single reel on which the recording tape is wound; a housing for holding the reel rotatably and including a take-up opening from which the tape is taken up and a holding portion formed adjacent to the opening; and an urging member for urging the leading member and securing the same at the holding portion when the recording tape is taken back in the housing; wherein the urging member including a pressing portion formed continuously in the axial direction of the leading member and contacting both ends of the leading member when the leading member is secured at the holding portion.

The pressing portion of the urging member of the recording tape cartridge is an integrated member formed continuously in the axial direction of the leader member. Therefore, an equal force is applied to both ends of the leading member, and there happens no slanting of the leading member.

Accordingly, since the urging force from the urging member is not different between one end of the leader member and the another, the leader member does not slant because the leader member is held at an optimal position when the recording tape is taken up from the reel. When the recording tape is pulled out from the housing, the leader member is correctly chucked by the chucking member, which is disposed at the tape drive. Therefore, the recording tape is correctly wound around a reel disposed at the tape drive.

As described above, the pressing portion of the urging member extends continuously in the axial direction of the leader member. In other words, the pressing member is formed to be continuous in the axial direction of the leader member and when the recording tape is taken back into the housing, the leader member is secured at the holding portion.

Examples of the recording tape include a magnetic tape used as an external recording medium for computers.

Examples of the leader member include a leader pin, which is a rod-shaped member extending in the width direction of the recording tape and both ends of the leader pin protrude from the edges of the recording tape.

The leader pin can be cylindrical and can have flanges formed at both ends thereof.

In the housing, a take-up opening and a holding portion are formed. The holding portion is formed adjacent to the take-up opening and functions to secure the leader member when the recording tape is taken back into the housing.

The holding portion includes a recess formed on an inner wall of the housing as well as a holding member that is hook-shaped and is mounted on the inner wall of the housing. The holding member can be formed integrally with the housing. It also can be a separately formed member fixed to the inner wall.

The urging member has a function of urging the leader member to secure the same in the holding portion and comprises, at end portions thereof, pressing portions, which contact at least both ends of the leading member. A shape of the pressing portion is not particularly limited, as long as they extend along the width direction of the recording tape.

A plate spring is a preferable example of the urging member in that a plate spring has a simple configuration. The plate spring can have a frame-shape with a central portion of the plate spring cut-out. In addition to the plate spring, an example of the urging member also includes a device comprising a contacting member, an arm member and a spring. The contacting member includes a function of the pressing portion. The contacting member is fixed to one end of the arm member and the other end of the arm member is rotatably mounted on the inner wall of the housing. The spring is disposed between the arm member and the inner wall so that the spring urges the arm member to hold the lead member in the holding portion. Example of the spring includes a coil spring and a plate spring.

A second aspect of this invention for achieving the above-mentioned object is the recording tape cartridge of the first aspect wherein the leader member is a leader pin.

In the recording tape cartridge, the recording tape is pulled out from the housing and rolled into the interior of the drive by both ends of the leader pin being grasped by a checking portion of the derive, and the leader pin being drawn into the interior of the tape drive.

A third aspect of this invention is the recording tape cartridge of the second aspect wherein the holding portion is a pair of recessions formed at a position of an inner wall of the housing adjacent to the take-up opening so as to face to each other with the recording tape therebetween.

In the above tape cartridge, when the recording tape is taken back in the housing, the leader member is secured at a position adjacent to the opening by both ends of the leader member being inserted into the recess. The recess may be groove-shaped. This groove-shaped recess can be referred to as a holding groove. The recess is preferably formed so as to narrow in the direction of the inside of the housing. A recess formed in this way engages with the leader member more securely when the recording tape is taken up into the housing. Since the pair of recesses is formed as the holding portion, parts for forming the holding portion are unnecessary. Accordingly, the number of parts can be reduced and assembly is simple.

A fourth aspect of this invention is the recording tape cartridge of the third aspect wherein the urging member is a plate spring.

A fifth aspect of this invention is the recording tape cartridge of the fourth aspect wherein the plate spring is formed of metal.

In this recording tape cartridge, the leader member passes through a gap between the inner wall of the housing and the pressing portion of the plate spring, overcoming a spring force from the plate spring to be secured in the holding portion when the recording tape is taken back into the housing. When the leading member passes the interval, the leader member is held in the holding portion by the spring force from the plate spring.

When the recording tape is taken up into the tape drive, the chucking device overcome the spring force from the plate spring to draw the leader member into the tape drive.

The plate spring can be produced by bending a rectangular, thin metal sheet and the pressing portion can be formed at one end of the bent, thin, metal sheet. Moreover, the plate spring can be fixed to an interior wall of the housing by disposing a securing groove, which secures the other end of the plate spring, on the interior wall of the housing, and inserting the other end into the securing groove.

The recording tape cartridge is an example in which the holding portion is a pair of recesses and the urging member is a plate spring.

A sixth aspect of this invention is the recording tape cartridge of the fifth aspect wherein the plate spring has a frame-like shape and an opening in a central portion thereof.

By forming an opening in its central portion, the spring force of the plate spring can be easily reduced. Therefore, when a reduced spring force is required, the above-mentioned plate spring is preferable as the urging member.

A seventh aspect of this invention is the recording tape cartridge of the sixth aspect wherein the recording tape is a magnetic tape.

In the above recording tape cartridge, when the magnetic tape is wound on the reel, the leader member is held in the housing in a most optimal position. When taking up the magnetic tape, a chucking device of a tape drive correctly chucks the leader member and the magnetic tape taken up from the housing is correctly wound on the reel of the tape drive.

Therefore, a trouble such as a reading error or a jamming caused by incorrect taking up of the magnetic tape on the reel can be avoided and this aspect provides a reliable magnetic tape cartridge that can be used as an external recording medium for a computer.

An eighth aspect of this invention relates to the recording tape cartridge of the fourth aspect wherein the plate spring is formed integrally with the housing.

The housing of a recording tape cartridge is usually formed by injection moulding of a thermoplastic resin. In the recording tape cartridge of this aspect, its plate spring can be moulded integrally with the housing. Therefore, the structure of the recording tape cartridge of this aspect is simple. Additionally, there is no need to dispose an under-cut portion in a mould for moulding arm portions and the mould can be easily parted because the pressing portion of the plate spring is not a pair of arms but a portion continuously formed in the axial direction of the leader member.

A ninth aspect of this invention is the recording tape cartridge of the eighth aspect wherein the recording tape is a magnetic tape.

A tenth aspect of this invention is the recording tape cartridge of the second aspect wherein the urging member is a plate spring.

An eleventh aspect of this invention is the recording tape cartridge of the tenth aspect wherein the plate spring is formed of metal.

A twelfth aspect of this invention is the recording tape cartridge of the eleventh aspect wherein the plate spring has a frame-like shape and an opening in a central portion thereof.

A thirteenth aspect of this invention is the recording tape cartridge of the twelfth aspect wherein the recording tape is a magnetic tape.

A fourteenth aspect of this invention is the recording tape cartridge of the tenth aspect wherein the plate spring is formed integrally with the housing.

A fifteenth aspect of this invention is the recording tape cartridge of the fourteenth aspect wherein the recording tape is a magnetic tape.

DESCRIPTION OF THE PREFERRED EMBODIMENTS

Figure 1:
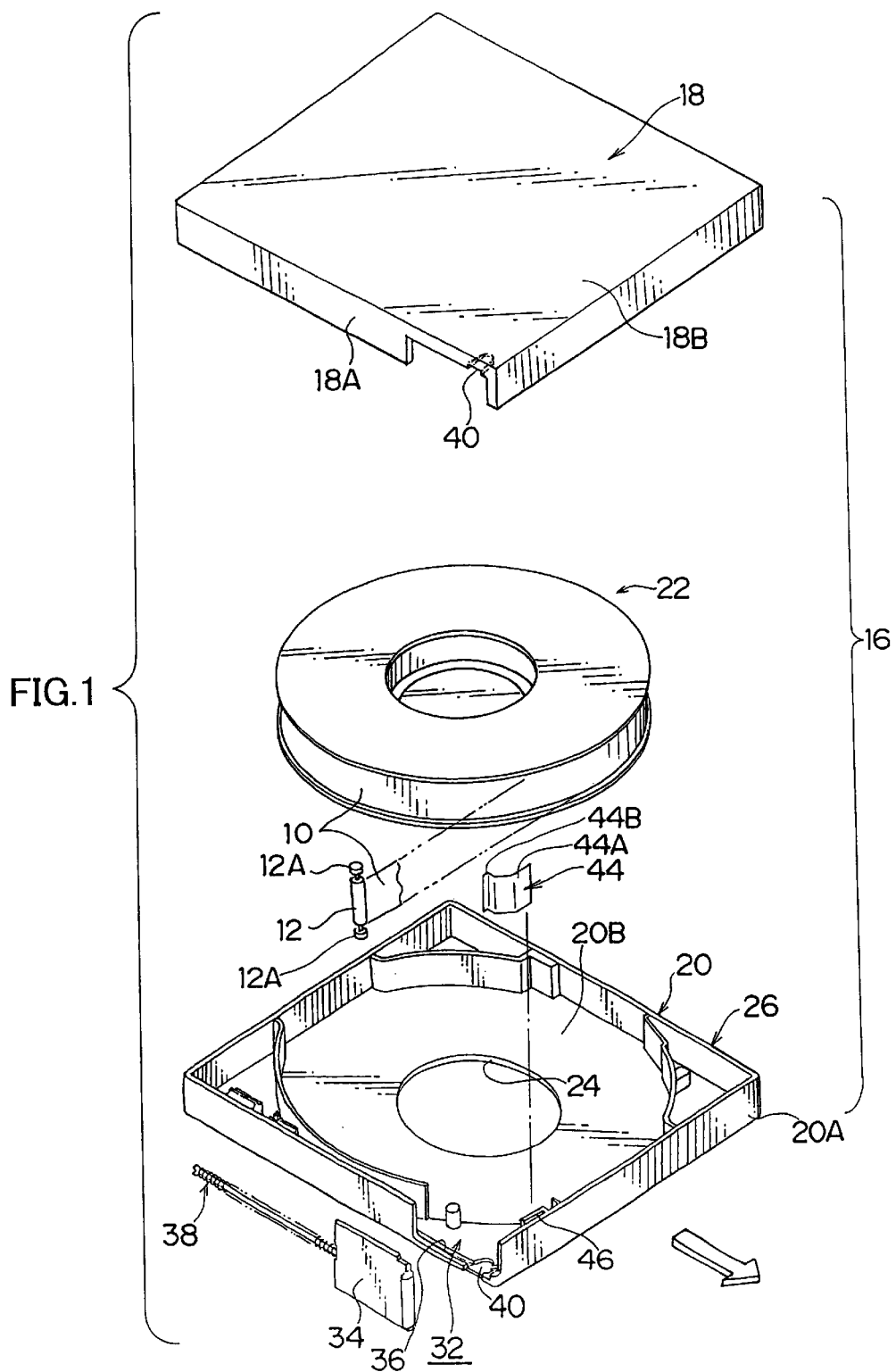
FIG. 1 is an exploded view of a magnetic tape cartridge of the first embodiment.
Figure 2:
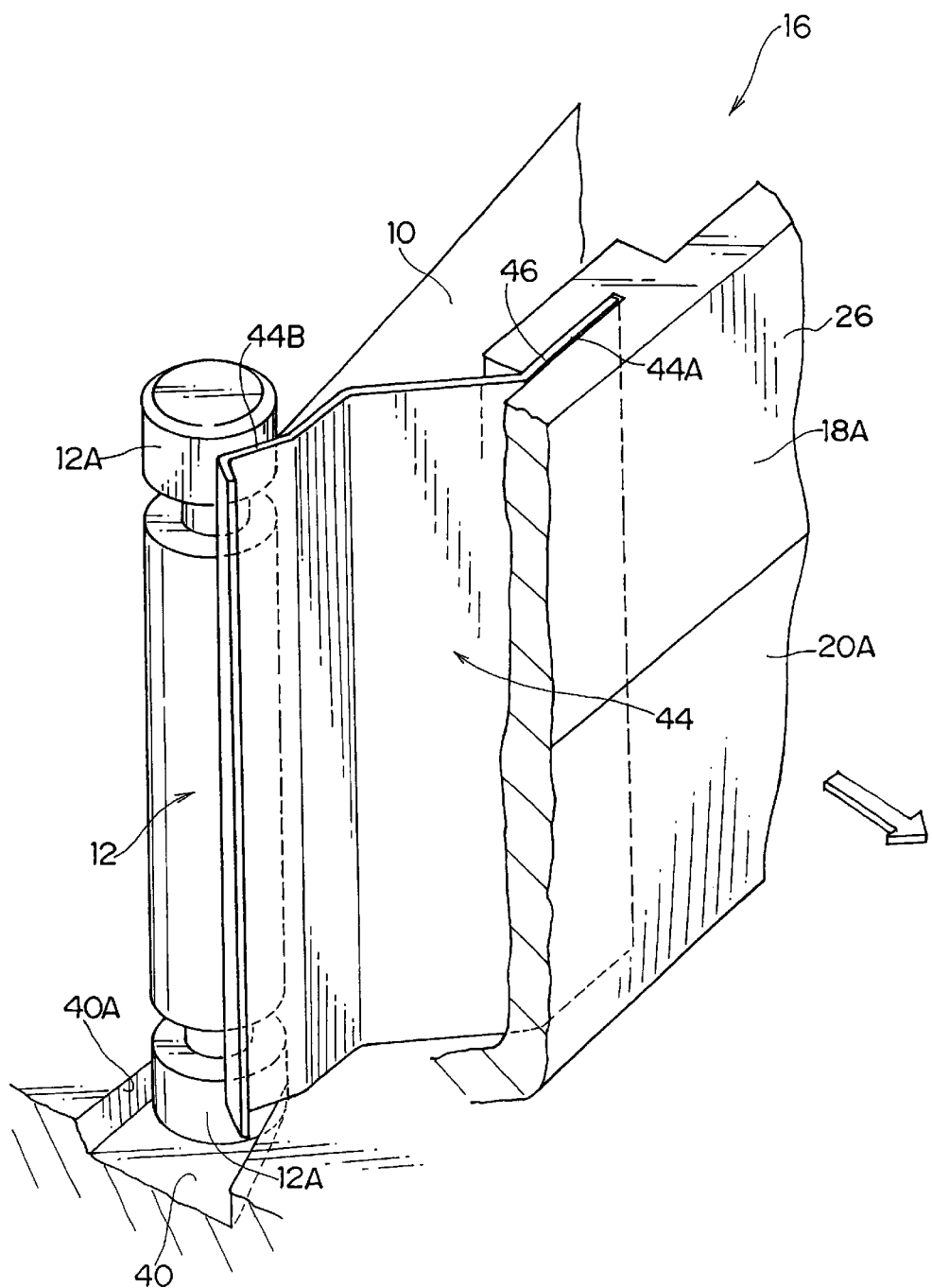
FIG. 2 is a perspective view showing the relative position of the fixing slot, the plate spring and the leader pin of the magnetic tape cartridge shown in FIG. 1.
Figure 3:
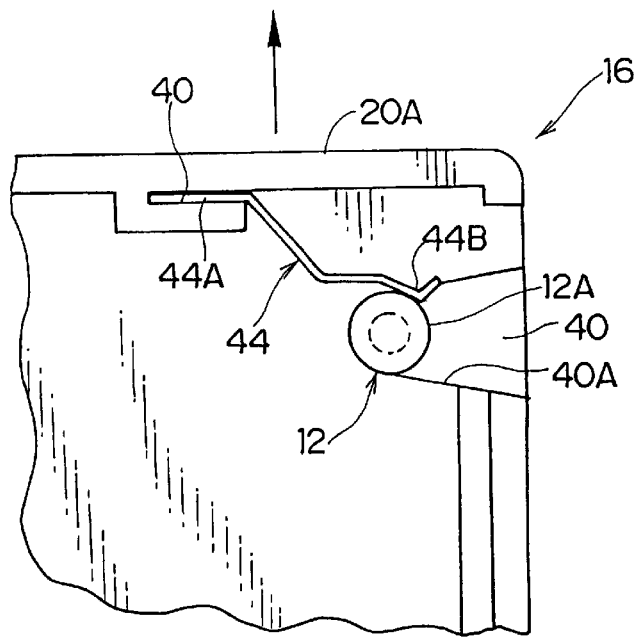
FIG. 3 is a sectional view showing the relative position of the fixing slot, the plate spring and the leader pin shown in FIG. 2.
Figure 4:
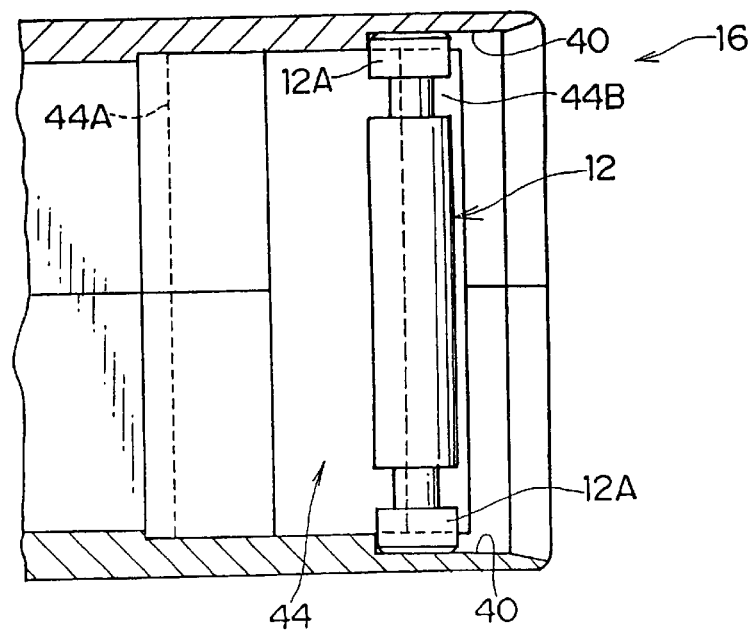
FIG. 4 is a side view showing the relative position of the fixing slot, the plate spring and the leader pin of the magnetic tape cartridge shown in FIG. 1.

Referring to FIGS. 1 to 4, a magnetic tape cartridge 16 of a first embodiment of the invention will be described. Arrows in FIGS. 1 to 3 show a loading direction of the magnetic tape cartridge into a tape drive.

An upper housing 18 and a lower housing 20, both of which are formed of a thermoplastic resin, are connected so that the edges of a side 18A and a side 20A contact each other to form a housing 26 of the magnetic tape cartridge 16.

The housing 26 holds rotatably a single reel 22 on which a magnetic tape 10, which is an example of the recording tape disposed in the recording tape cartridge of this invention, is wound. At a central portion of the lower housing 20, a circular opening 24 opens so that a reel gear disposed at the lower side of the reel 22 emerges from the opening 24.

On the front right side of both of the upper housing 18 and the lower housing 20, relative to the loading direction, there are notched rectangular openings. When the upper housing 18 and the lower housing 20 are connected, the openings form a take-up opening 32, from which the magnetic tape 10 with a leader pin 12 are taken up out of the housing 26. A top plate 18B and a bottom plate 20B form the upper and the lower edges of the take-up opening 32. Since the take-up opening 32 is provided in a front side of the housing 26, a taking-up path of the magnetic tape 10 in a tape drive can be set to be a short path and the tape drive can be constructed compactly.

A slide door 34 for closing the take-up opening 32 is disposed at the take-up opening 32. At each of the top plate 18B and the bottom plate 20B, grooves 36 are formed along the upper and lower edges of the take-up opening 32. Upper and lower edges of the sliding door 34 engage with the grooves 36 and the slide door 34 slides along the grooves 36 to close and open the take-up opening 32. A coil spring 36 urges the sliding door 34 in a direction of the take-up opening 32 so the take-up opening 32 is normally closed.

On the inside surfaces of the top plate 18B and the bottom plate 20B, at portions thereof adjacent to the take-up opening 32, a pair of holding grooves 40 is formed so that they face to each other and extend toward the take-up opening 32. The holding groove 40 is an example of the holding portion of the claimed recording tape cartridge. By inserting a flange 12A, which is formed at each end of a leader pin 12, into each of the holding grooves 40, the leader pin 12 is positioned at a place for being chucked by a chucking member, which is disposed at the tape drive.

On an inside of the front walls of the upper housing 18 and the lower housing 20, an engaging slot 46, to which a straight portion 44A of a plate spring 44 is fixed, is formed. A rectangular metal plate is made to have spring characteristics by being bent into plate spring 44. On a top end of the plate spring 44, a pressing portion 44B, which contacts a peripheral surface of the flanges 12A of the leader pin 12, is provided. The pressing portion 44B is formed to extend in the axial direction of the leader pin 12, when the leader pin 12 is secured in holding groove 40.

Therefore, spring force from the plate spring 44 effects both ends of the leader pin 12 uniformly and the plate spring 44 pressing each of the ends of the leader pin 12 unevenly and making the leader pin 12 slant can be avoided. Accordingly, the leader pin 12 is pressed to a peripheral wall 40A of the holding groove 40 without slanting and is secured in the housing 26 in an optimum position. When the magnetic tape cartridge 16 is loaded in a tape drive, the leader pin 12 can be taken up securely. The leader pin 12, which is taken up from housing 26, is engaged by a taking-up reel of the tape drive. Thus, the magnetic tape 10 is wound on the taking-up reel with the leader pin 12 and data is recorded on or played back from the magnetic tape 10.

Figure 5:
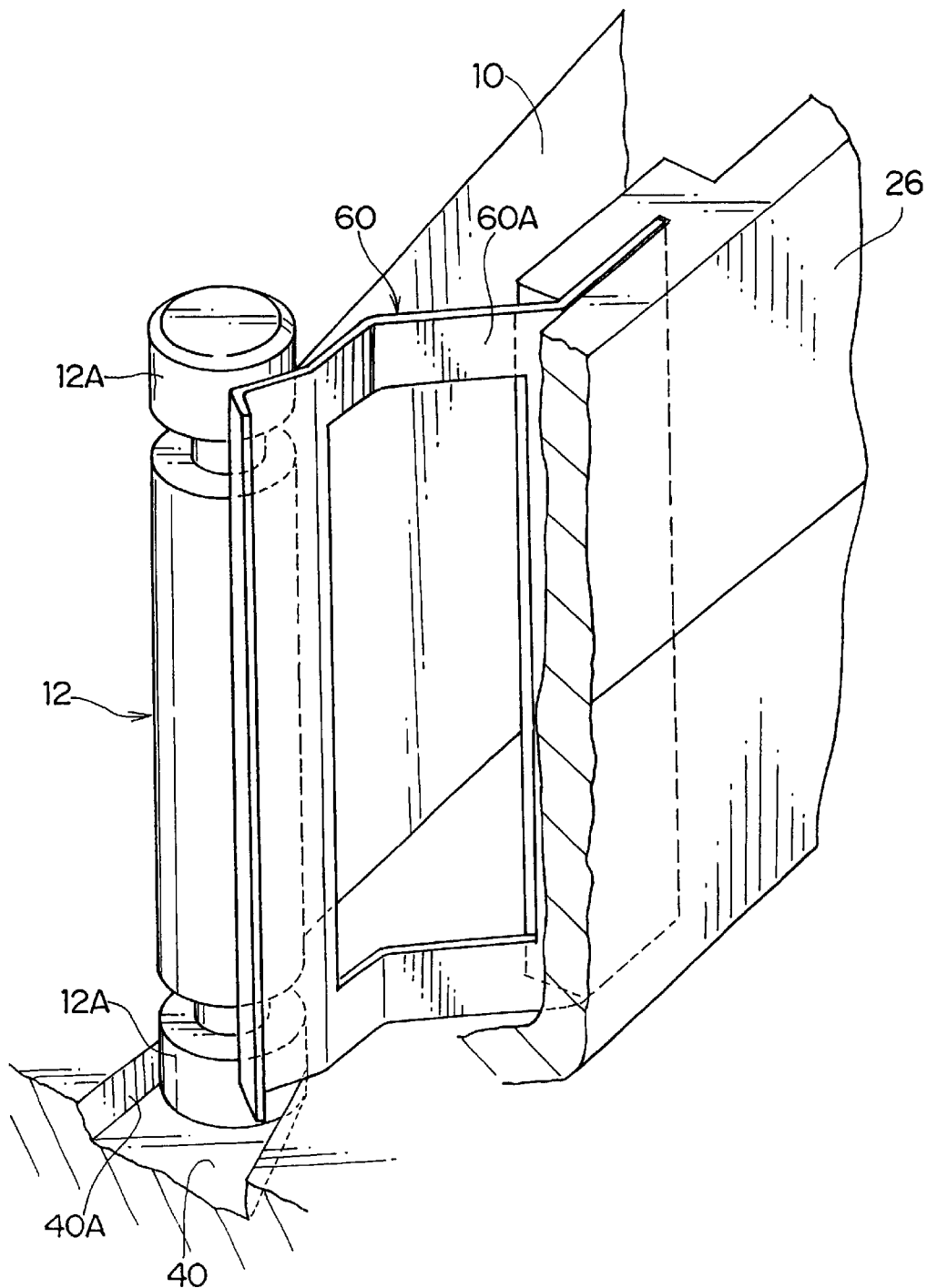
FIG. 5 is a perspective view showing the relative position of the fixing slot, the plate spring and the leader pin of the magnetic tape cartridge of the second embodiment.

It is acceptable as long as the urging member in the present invention is formed so that the pressing portion, which contacts both ends of the leader pin 12, extends in the axial direction of the leader pin 12. Therefore, it is not necessary of the urging member to comprise a single, rectangular plate spring 44. FIG. 5 shows an example of the magnetic tape cartridge of a second embodiment, which includes, as the urging member, a frame-shaped plate spring 60, which has a central portion cut-out from a straight portion 60A of the plate spring 60.

Figure 6:
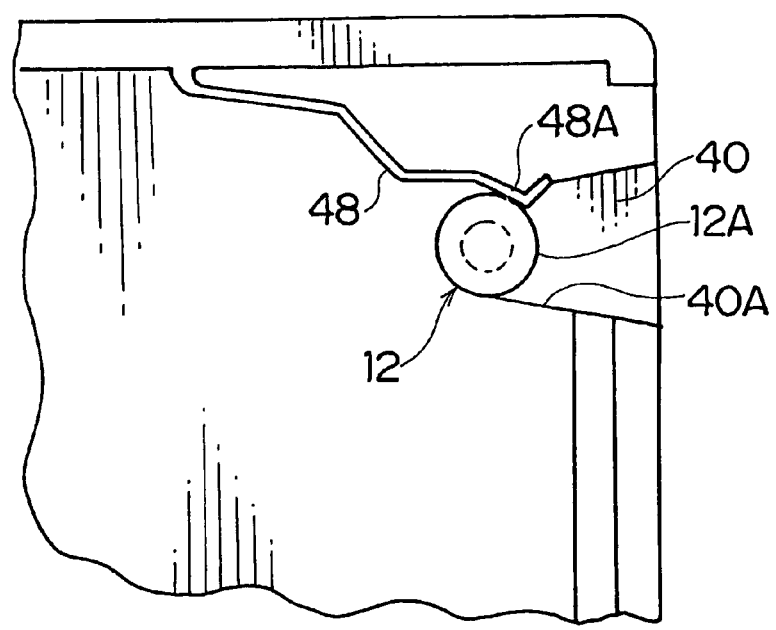
FIG. 6 is a sectional view showing the relative position of the fixing slot, the plate spring and the leader pin of the magnetic tape cartridge of the third embodiment.

Additionally, as shown in FIG. 6, a magnetic tape cartridge of a third embodiment of the invention, may comprise a plate spring 48, which is not formed separately but is moulded integrally to the housing 26 from a plastic. In this embodiment, a pressing portion 48A of the plate spring 48 extends in the axial direction of the leader pin 12, therefore, the housing 26 can be moulded by a simple mould without under cutting. In addition, by forming the plate spring 48 and the housing 26 integrally, the number of parts can be reduced and the cartridge 16 can be more easily assembled.

Figure 7:
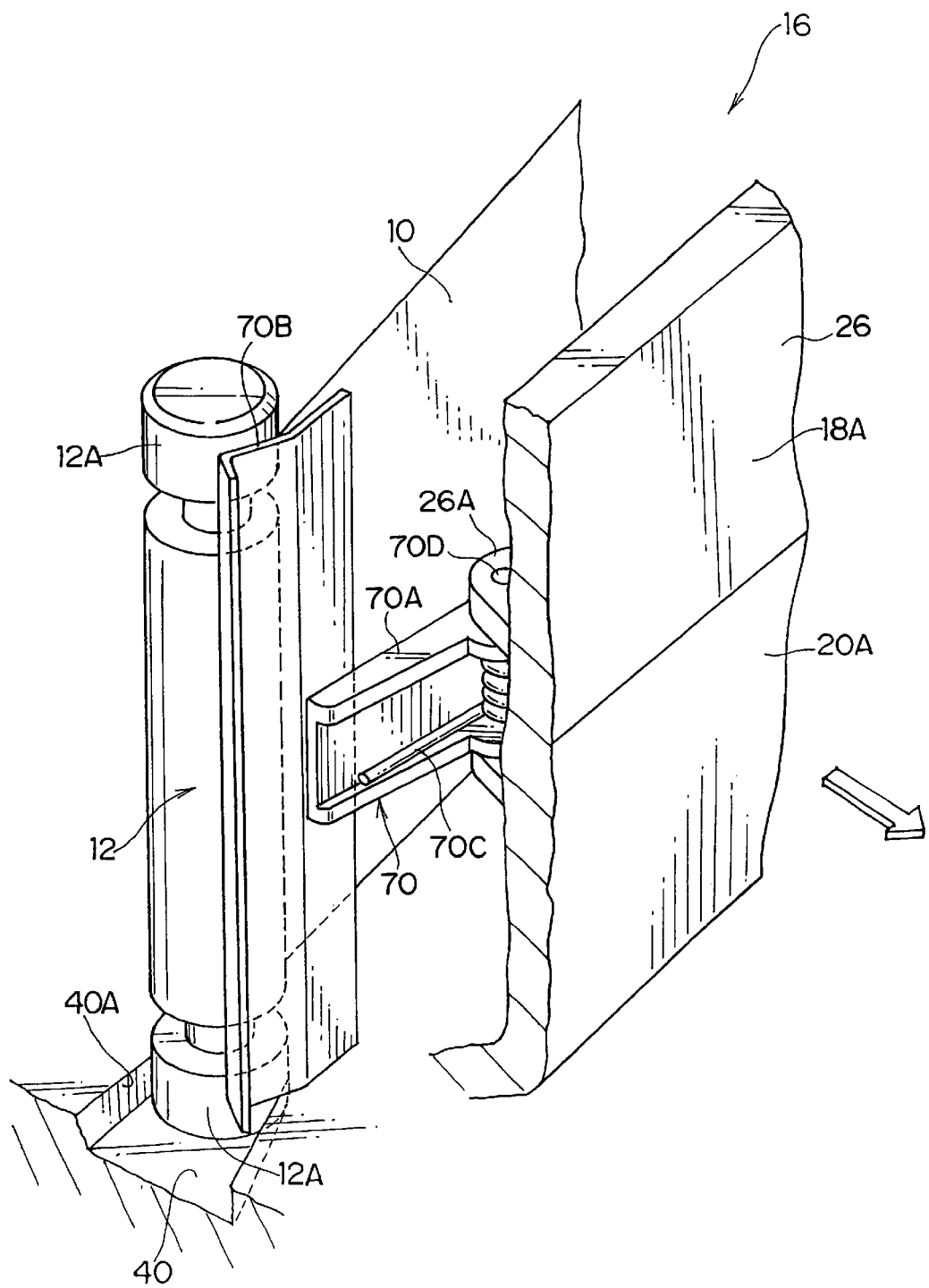
FIG. 7 is a perspective view of the assembly of the fixing slot, the plate spring and the leader pin of the magnetic tape cartridge of the fourth embodiment.

Furthermore, instead of the plate springs 44, 48, and 60, as shown in a magnetic tape cartridge of a fourth embodiment shown in FIG. 7, the present invention also comprises a forcing device 70 having a T-shape and including a contacting member 70B functioning as a pressing portion, an arm 70A, one end of which is fixed to the contacting member 70B and at the other end of which is mounted rotatably at a pair of supporting portions 26A, which protrude from the inner wall of the housing 26, by an axis 70D, and a torsion coil spring 70C, which urges the arm 70A so that leader pin 12 is secured in the holding grooves 40.

Figure 8:
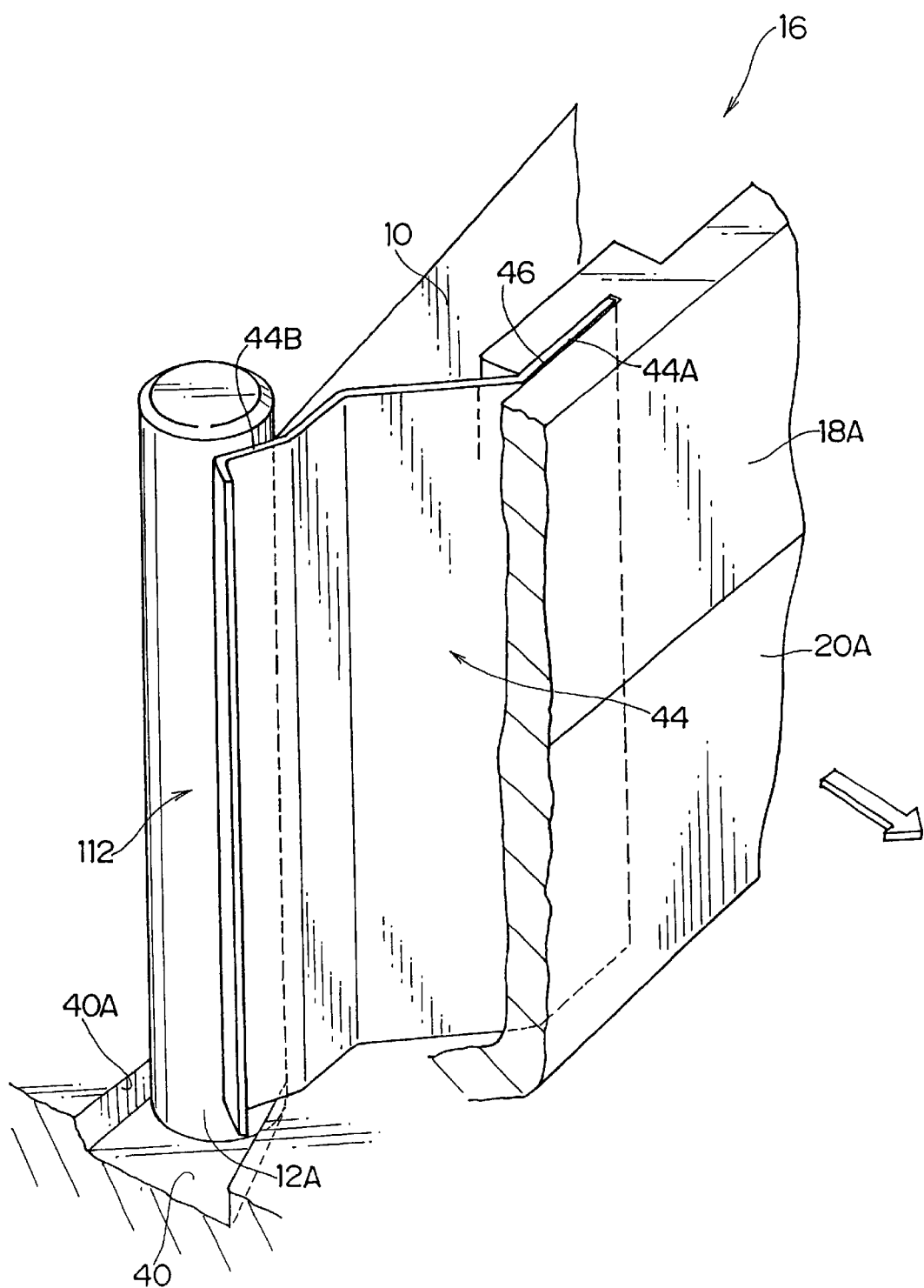
FIG. 8 is a perspective view showing the relative position of the fixing slot, the plate spring and the leader pin of the magnetic tape cartridge of the fifth embodiment.
Figure 9:
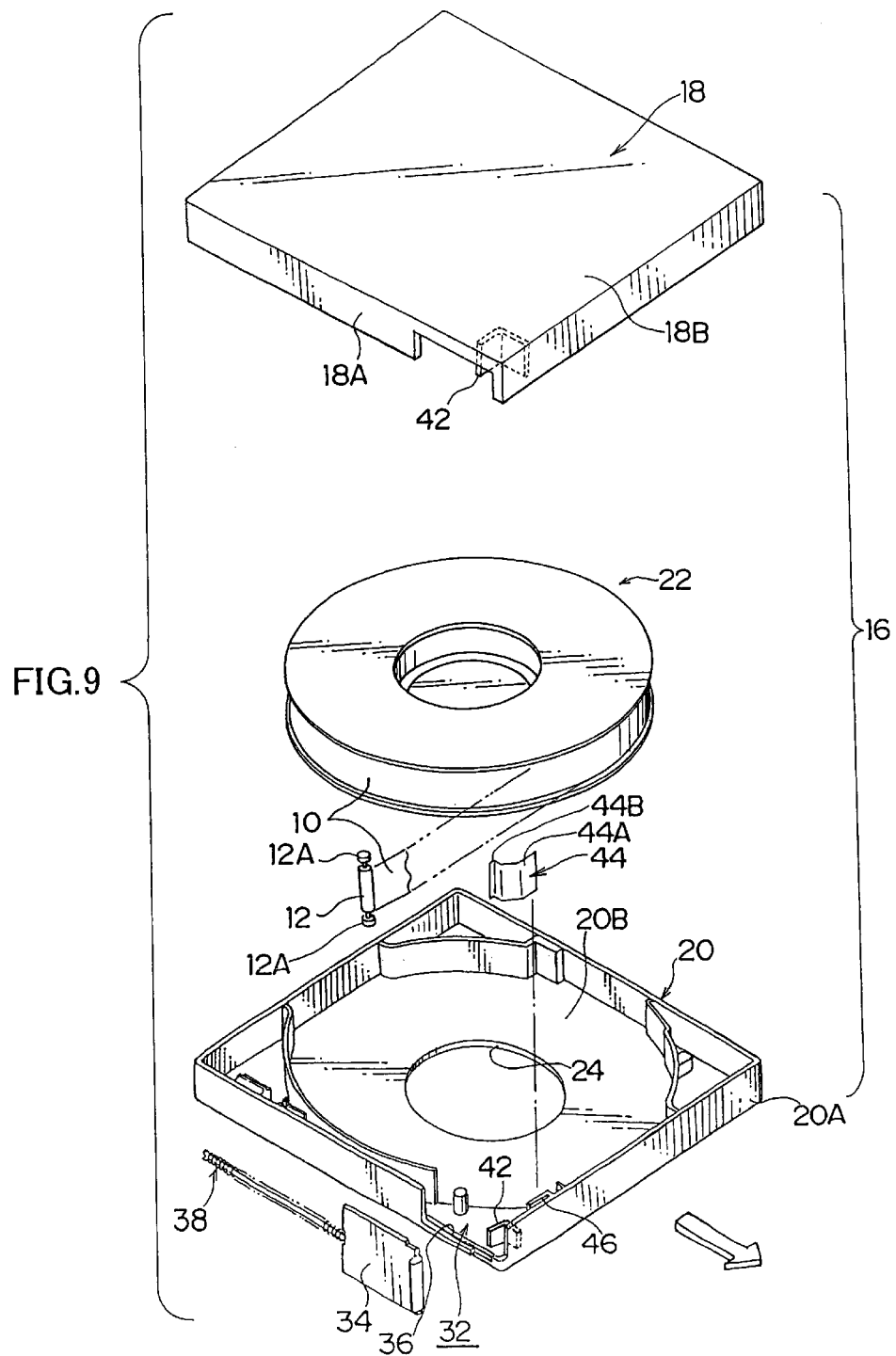
FIG. 9 is an exploded view of the magnetic tape cartridge of the sixth embodiment.
Figure 10:
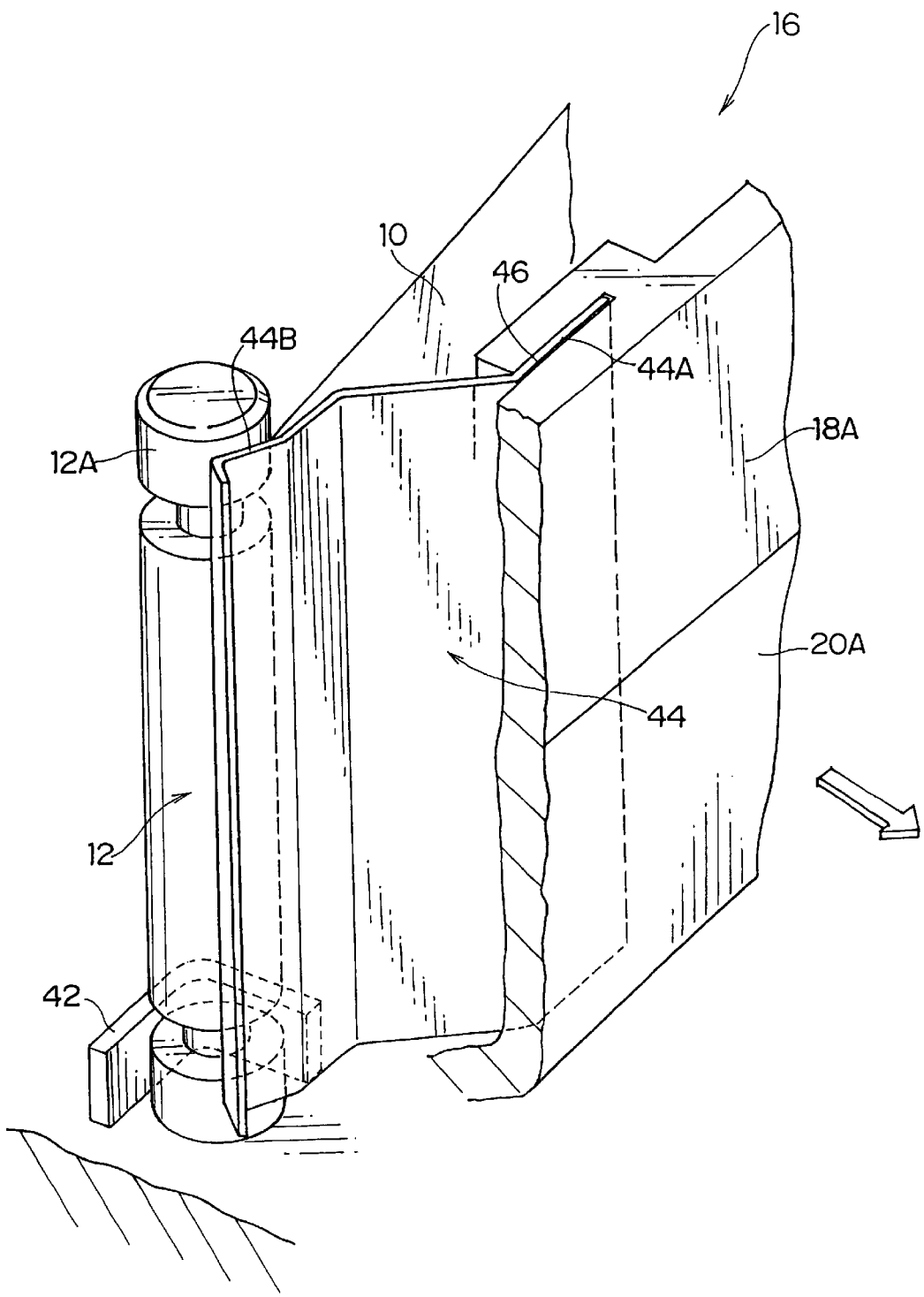
FIG. 10 is a perspective view showing the relative position of the fixing slot, the plate spring and the leader pin of the magnetic tape cartridge of the sixth embodiment.
Figure 11:
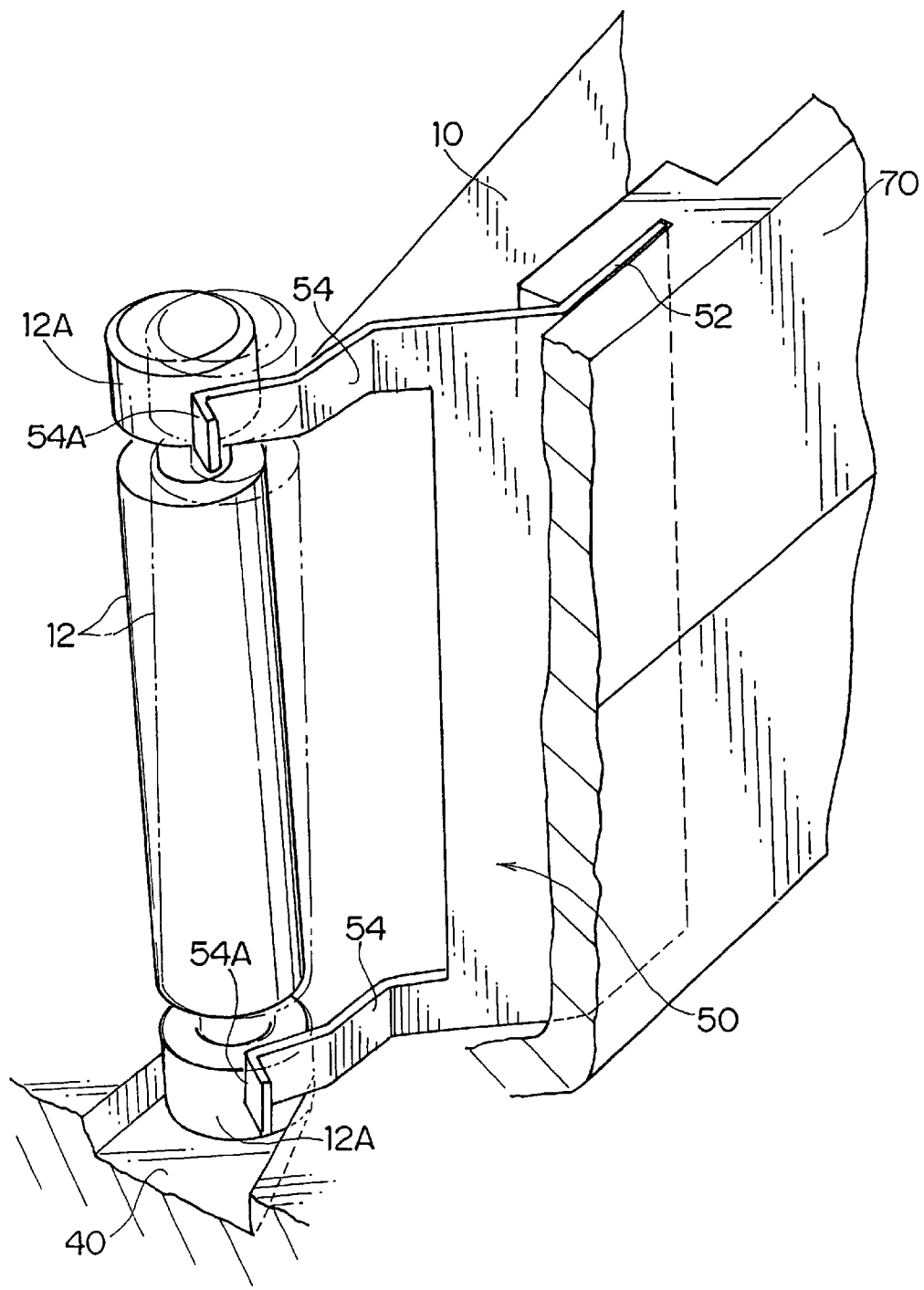
FIG. 11 is a perspective view showing a relative position of the fixing slot, the plate spring and the leader pin of a magnetic tape cartridge of the prior art.

Moreover, as long as the leader member is formed to be held in the holding groove 40 by the spring force of the plate spring, it is not necessary for flange portions 12A to be formed at the ends of the leader pin 12 of the first embodiment. Therefore, as shown in FIG. 8, a magnetic tape cartridge of a fourth embodiment with leader pin 112 that is cylindrical and has a uniform diameter is included in this invention.

In addition, the holding portion of the recording tape cartridge of this invention includes a magnetic tape cartridge of a fifth embodiment having a pair of hook-shaped hook holding members 42 protruding from the insides of both of the top plate 18B and the bottom plate 20B.

What is claimed is:

1. A recording tape cartridge comprising:
   a recording tape;
   a leader member attached at an end of the recording tape and extending in a width direction of the recording tape;
   a single reel on which the recording tape is wound;

a housing for holding the reel rotatably and including a take-up opening from which the tape is taken up and a holding portion formed adjacent to the opening; and an urging member for urging the leading member and securing the same at the holding portion when the recording tape is taken back in the housing;

the urging member including a pressing portion formed continuously in the axial direction of the leading member and contacting both ends of the leading member when the leading member is secured at the holding portion.

2. The recording tape cartridge of claim 1, wherein the leader member is a leader pin.

3. The recording tape cartridge of claim 2, wherein the holding portion is a pair of recessions formed at a position of an inner wall of the housing adjacent to the take-up opening so as to face to each other with the recording tape therebetween.

4. The recording tape cartridge of claim 3, wherein the urging member is a plate spring.

5. The recording tape cartridge of claim 4, wherein the plate spring is formed of metal.

6. The recording tape cartridge of claim 5, wherein the plate spring has a frame-shape and an opening in a central portion thereof.

7. The recording tape cartridge of claim 6, wherein the recording tape is a magnetic tape.

8. The recording tape cartridge of claim 4, wherein the plate spring is formed integrally with the housing.

9. The recording tape cartridge of claim 8, wherein the recording tape is a magnetic tape.

10. The recording tape cartridge of claim 2, wherein the urging member is a plate spring.

11. The recording tape cartridge of claim 10, wherein the plate spring is formed of metal.

12. The recording tape cartridge of claim 11, wherein the plate spring has a frame-shape and an opening in a central portion thereof.

13. The recording tape cartridge of claim 12, wherein the recording tape is a magnetic tape.

14. The recording tape cartridge of claim 10, wherein the plate spring is formed integrally with the housing.

15. The recording tape cartridge of claim 14, wherein the recording tape is a magnetic tape.

16. The recording tape cartridge of claim 1, wherein the urging member contacts the leader member at at least two portions thereof, said portions being connected to each other in the axial direction of the leading member.

17. The recording tape cartridge of claim 16, wherein the leader member is a leader pin.

18. The recording tape cartridge of claim 17, wherein the holding portion is a pair of recessions formed at a position of an inner wall of the housing adjacent to the take-up opening so as to face to each other with the recording tape therebetween.

19. The recording tape cartridge of claim 18, wherein the urging member is a plate spring.

20. The recording tape cartridge of claim 19, wherein the plate spring is formed of metal.

* * * * *